(12) United States Patent
Namba et al.

(10) Patent No.: US 10,244,338 B2
(45) Date of Patent: Mar. 26, 2019

(54) INFORMATION PROCESSING DEVICE AND INFORMATION PROCESSING METHOD

(71) Applicant: SONY CORPORATION, Tokyo (JP)

(72) Inventors: Ryuichi Namba, Tokyo (JP); Masayuki Nishiguchi, Kanagawa (JP); Kaneaki Fujishita, Chiba (JP); Shiro Suzuki, Kanagawa (JP); Toru Chinen, Kanagawa (JP); Mitsuyuki Hatanaka, Kanagawa (JP); Yuki Yamamoto, Tokyo (JP); Hiroharu Kato, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/557,033

(22) PCT Filed: Jan. 25, 2016

(86) PCT No.: PCT/JP2016/052004
§ 371 (c)(1),
(2) Date: Sep. 8, 2017

(87) PCT Pub. No.: WO2016/152233
PCT Pub. Date: Sep. 29, 2016

(65) Prior Publication Data
US 2018/0077508 A1    Mar. 15, 2018

(30) Foreign Application Priority Data
Mar. 23, 2015 (JP) .................. 2015-059786

(51) Int. Cl.
*H04R 1/40* (2006.01)
*H04R 3/00* (2006.01)
(Continued)

(52) U.S. Cl.
CPC ..... *H04R 29/008* (2013.01); *G06F 17/30743* (2013.01); *G06F 17/30778* (2013.01);
(Continued)

(58) Field of Classification Search
None
See application file for complete search history.

(56) References Cited

U.S. PATENT DOCUMENTS 6,107,918 A * 8/2000 Klein ............... G08B 25/14
340/3.1
9,384,734 B1 * 7/2016 Wiseman ............. G10L 15/26
(Continued)

FOREIGN PATENT DOCUMENTS

EP    2565601 A2    3/2013
EP    2687831 A1    1/2014
(Continued)

OTHER PUBLICATIONS

Rion NA-37B Class 1 Aircraft Noise Monitor, ANV Systems, Mar. 4, 2016, 02 pages.
(Continued)

*Primary Examiner* — Curtis A Kuntz
*Assistant Examiner* — Kenny H Truong
(74) *Attorney, Agent, or Firm* — Chip Law Group

(57) ABSTRACT

The information processing device includes: a feature amount extraction unit configured to extract a feature amount from sounds in a predetermined space; an identification unit configured to identify a type of a sound included in the sounds from the feature amount; an information combining unit configured to generate sound statistic information in which the feature amount, the type of the sound, and spatiotemporal information of the predetermined space at a time of acquisition of the sound are associated with each other; and a database establishing unit configured to establish a sound statistic database by using the sound statistic information.

15 Claims, 15 Drawing Sheets

(51) Int. Cl.
  *G06F 17/30* (2006.01)
  *G10L 25/51* (2013.01)
  *G10L 25/54* (2013.01)
  *H04R 29/00* (2006.01)
  *G10L 21/0208* (2013.01)

(52) U.S. Cl.
  CPC .......... *G10L 21/0208* (2013.01); *G10L 25/51* (2013.01); *G10L 25/54* (2013.01); *H04R 1/406* (2013.01); *H04R 3/005* (2013.01); *H04R 2430/20* (2013.01)

(56) References Cited

U.S. PATENT DOCUMENTS

| | | | | |
|---|---|---|---|---|
| 2014/0294183 | A1* | 10/2014 | Lee | H04R 3/005 381/56 |
| 2014/0376728 | A1* | 12/2014 | Ramo | G06T 19/006 381/56 |
| 2015/0112678 | A1* | 4/2015 | Binks | G10L 25/48 704/236 |
| 2015/0378587 | A1* | 12/2015 | Falaki | H04L 67/02 715/747 |

FOREIGN PATENT DOCUMENTS

| | | |
|---|---|---|
| JP | 5016724 B1 | 9/2012 |
| JP | 5016726 B1 | 9/2012 |
| JP | 2012-198063 A | 10/2012 |
| JP | 2013-053918 A | 3/2013 |
| WO | 2012/127850 A1 | 9/2012 |

OTHER PUBLICATIONS

Environmental Sound Monitor (for Aircraft Noise Measurement), NA-37, Rion Co., Ltd., 12 pages.
Lee, et al., "Unsupervised Feature Learning for Audio Classification Using Convolutional Deep Belief Networks", 09 pages.
Environmental Sound Monitor (for Aircraft Noise Measurement), NA-37, Rion Co., Ltd., Jul. 26, 2013, 12 pages.
International Search Report and Written Opinion of PCT Application No. PCT/JP2016/052004, dated Mar. 15, 2016, 10 pages of ISRWO.
"Environmental Sound Monitor (for Aircraft Noise Measurement)" NA-37, Rion Co., Ltd., 11 pages.
"Rion N-37B Class 1 Aircraft Noise Monitor, ANV Measurement", ANV Ltd 2010, 02 pages.
Lee, et al., "Unsupervised feature learning for audio classification using convolutional deep belief networks", Computer Science Department Stanford University, 09 pages.

* cited by examiner

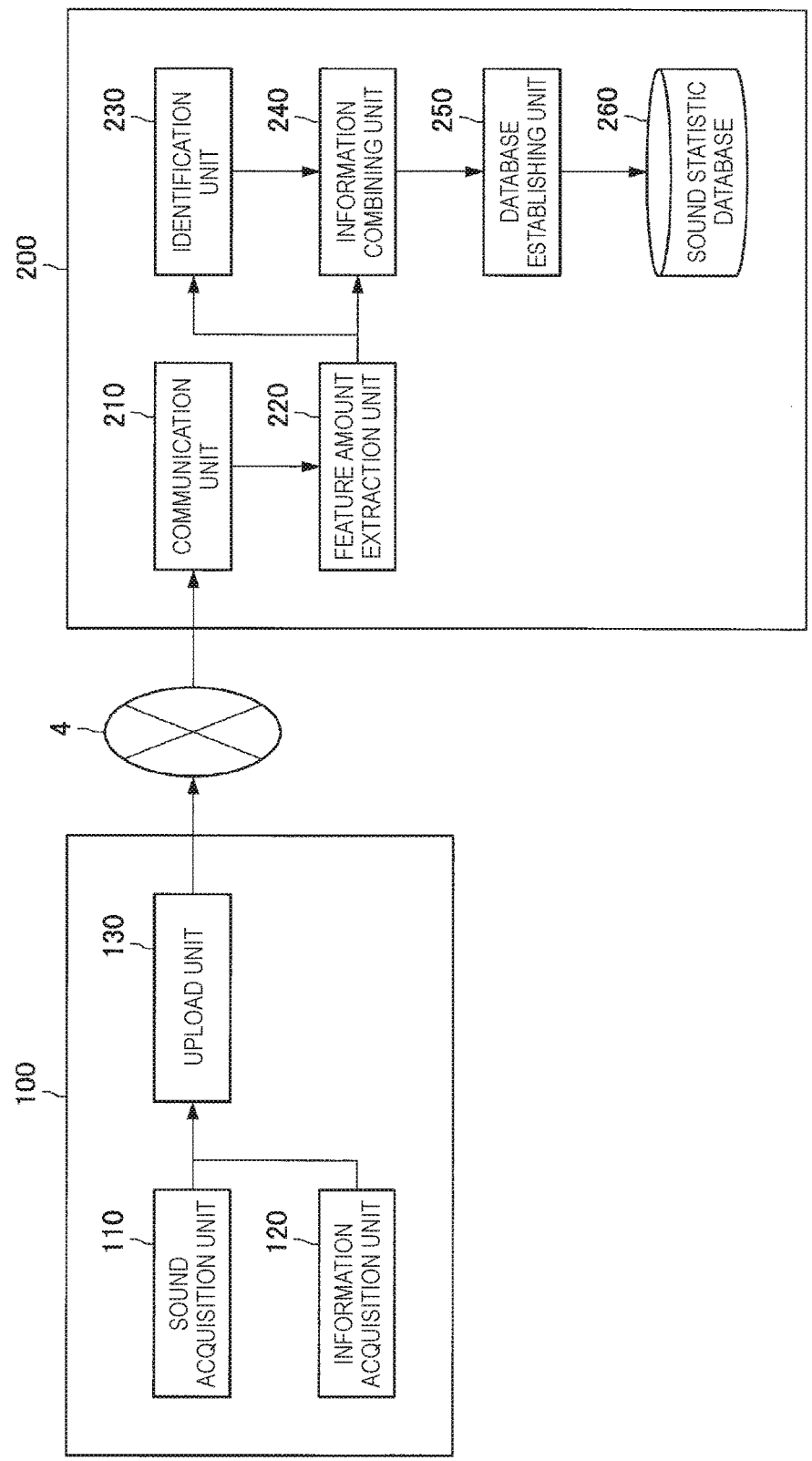

FIG.3A

| ID | LATITUDE | LONGITUDE | YEAR /MONTH /DATE | DAY | TIME SLOT | WEATHER | SOUND PRESSURE INFORMATION | TYPE INFORMATION | SOUND SOURCE CARDINAL DIRECTION INFORMATION | INDOOR POSITION | ... |
|---|---|---|---|---|---|---|---|---|---|---|---|
| 1 | 35.68 | 140.1 | 2012/1/1 | Mon | AM 9-12 | SNOWY | 64.1,64.2,64.5,... | | | 1 | ... |
| 2 | 35.52 | 139.8 | 2013/6/5 | Sun | PM 0-3 | RAINY | 67.8,67.1,66.5,... | | | 5 | ... |
| 3 | 36.3 | 141.2 | 2013/9/21 | Fri | AM 0-3 | CLOUDY | 65.5,65.7,65.1,... | | | -1 | ... |
| 4 | 35.6 | 140.5 | 2014/11/16 | Wed | PM 0-9 | SUNNY | 65.4,65.2,65.7,... | | | 0 | ... |
| ... | ... | ... | ... | ... | ... | ... | ... | ... | ... | ... | ... |

FIG.3B

| ID | TYPE1 | TYPE2 | ... | TYPE n-1 | TYPE n |
|---|---|---|---|---|---|
| 1 | 62.1,62.2,62.5,... | 1.5,1.7,1.1,... | ... | 0.5,0.7,0.1,... | 0.1,0.9,0.1,... |
| 2 | 0.1,0.3,0.5,... | 66.9,65.4,65.5,... | ... | 3.1,4.3,3.5,... | 2.2,2.3,2.6,... |
| 3 | 65.2,65.3,64.9,... | 0.5,0.7,0.1,... | ... | 1.0,1.3,1.0,... | 1.5,1.5,2.1,... |
| ... | ... | ... | ... | ... | ... |

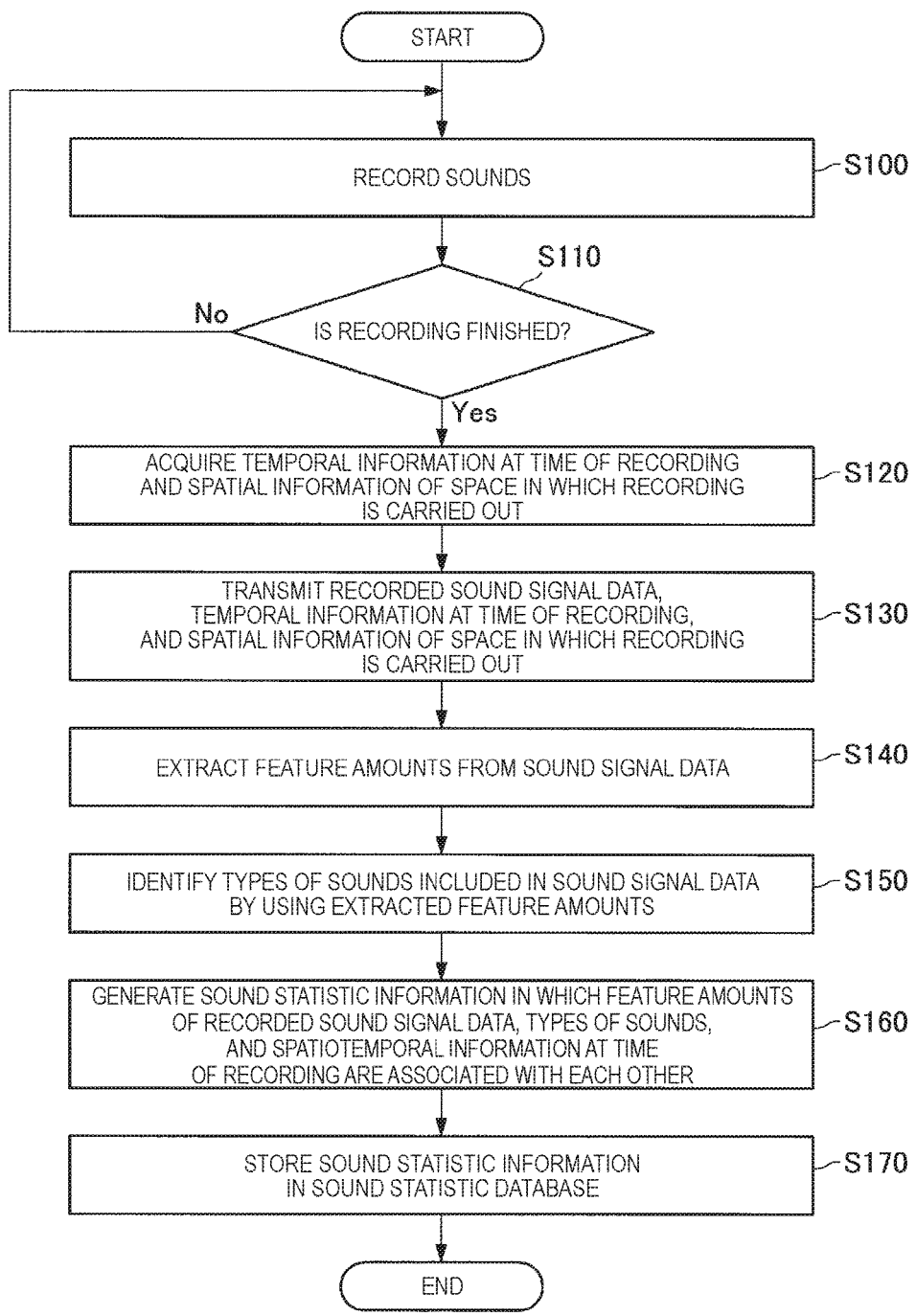

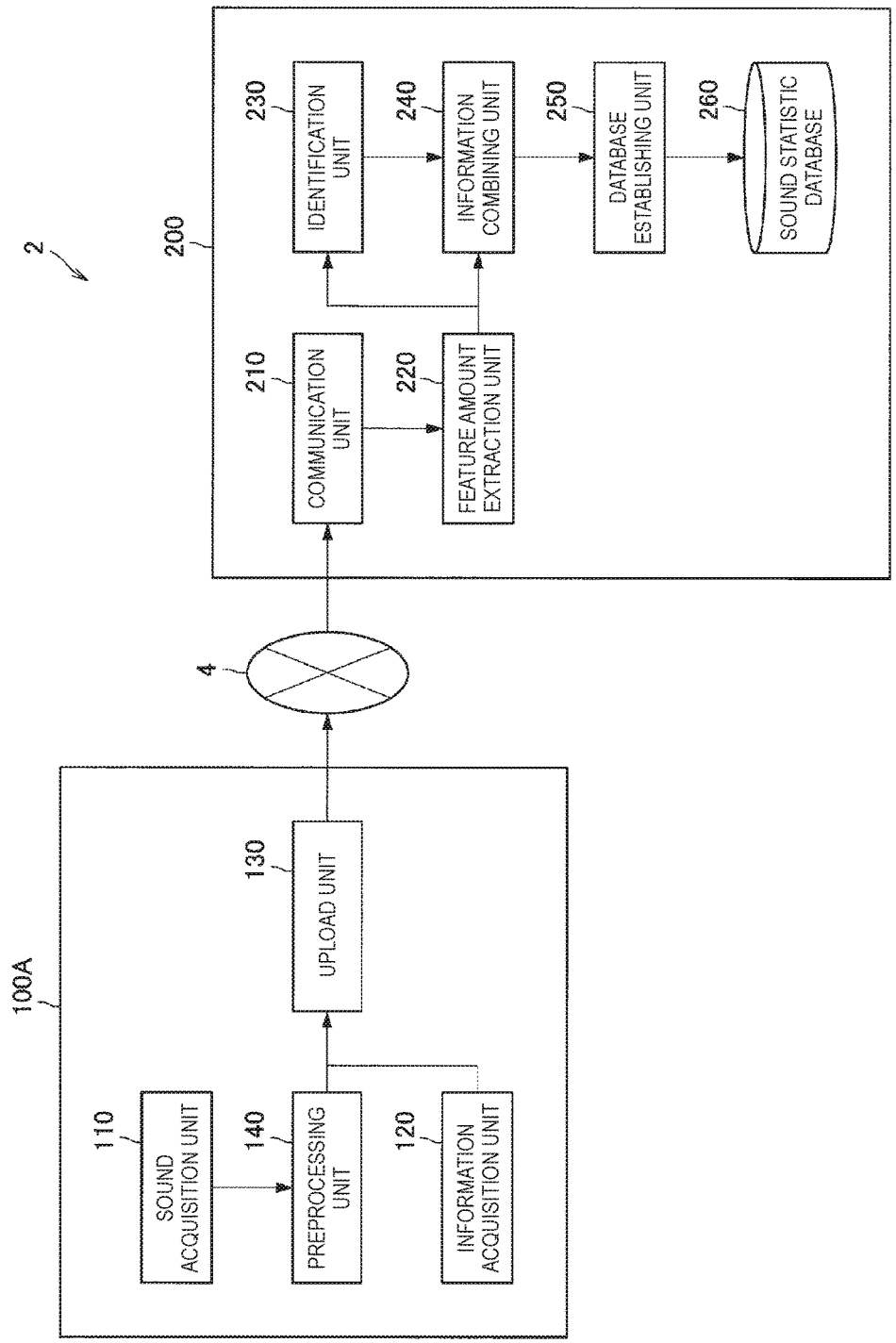

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2016/052004 filed on Jan. 25, 2016, which claims priority benefit of Japanese Patent Application No. JP 2015-059786 filed in the Japan Patent Office on Mar. 23, 2015. Each of the above-referenced applications is hereby incorporated herein by reference in its entirety.

TECHNICAL FIELD

The present disclosure relates to information processing devices, information processing methods, and programs.

BACKGROUND ART

In recent years, many databases for accumulating various kinds of data have been established, with development of the information society.

For example, there are established many databases such as a database for accumulating books in libraries and papers of research institutions, a database for accumulating scenery images in association with position information based on maps, a database for accumulating patent publications, a database for accumulating weather data, and the like. In addition, most of such databases allow general users to search for or refer to data, and many users use such databases.

In addition, in recent years, with development of information analysis technologies, research on pattern recognition technologies has been advanced in which it is possible to identify a type of data by extracting a feature amount from the data. Examples of such pattern recognition technologies include a sound identification technology for identifying types of sounds included in sound data, an optical character recognition technology for identifying characters in image data, a face authentication technology for identifying faces of individuals in image data, and the like.

A specific example of the sound identification technology for identifying types of sounds included in sound data is a technology described in Non-Patent Literature 1 listed below. By using the technology described in Non-Patent Literature 1, it is possible to recognize types of sounds and establish databases in which sounds are accumulated by the type.

CITATION LIST

Non-Patent Literature
  Non-Patent Literature 1: Honglak Lee et al., "Unsupervised feature learning for audio classification using convolutional deep belief networks", Advances in Neural Information Processing Systems, 2009, Volume 22, 1096-1104

DISCLOSURE OF INVENTION

Technical Problem

However, usage and application of the database in which sounds are accumulated by type are not well-argued, and usability of such a database is low. Therefore, a sound database with high usability and high possibility of application has been desired.

Accordingly, the present disclosure proposes a novel and improved information processing device, information processing method, and program that are capable of establishing a sound statistic database with high usability.

Solution to Problem

According to the present disclosure, there is provided an information processing device including: a feature amount extraction unit configured to extract a feature amount from sounds in a predetermined space; an identification unit configured to identify a type of a sound included in the sounds from the feature amount; an information combining unit configured to generate sound statistic information in which the feature amount, the type of the sound, and spatiotemporal information of the predetermined space at a time of acquisition of the sound are associated with each other; and a database establishing unit configured to establish a sound statistic database by using the sound statistic information.

In addition, according to the present disclosure, there is provided an information processing method including: extracting a feature amount from sounds in a predetermined space; identifying a type of a sound included in the sounds from the feature amount; generating, by a central processing unit, sound statistic information in which the feature amount, the type of the sound, and spatiotemporal information of the predetermined space at a time of acquisition of the sound are associated with each other; and establishing a sound statistic database by using the sound statistic information.

In addition, according to the present disclosure, there is provided a program causing a computer to function as: a feature amount extraction unit configured to extract a feature amount from sounds in a predetermined space; an identification unit configured to identify a type of a sound included in the sounds from the feature amount; an information combining unit configured to generate sound statistic information in which the feature amount, the type of the sound, and spatiotemporal information of the predetermined space at a time of acquisition of the sound are associated with each other; and a database establishing unit configured to establish a sound statistic database by using the sound statistic information.

According to the present disclosure, it is possible to establish a sound statistic database in which spatiotemporal information of a predetermined space is associated with types and feature amounts of sounds heard in the predetermined space. Therefore, for example, a user can recognize an environmental sound or an atmosphere in a designated space in advance, estimate change in an environment in a designated space from change in environmental sounds, and search for a space with an environmental sound or an atmosphere that the user want.

Advantageous Effects of Invention

As described above, according to the present disclosure, it is possible to establish a sound statistic database with high usability.

Note that the effects described above are not necessarily limitative. With or in the place of the above effects, there

BRIEF DESCRIPTION OF DRAWINGS

FIG. 2 is a block diagram illustrating an internal configuration of an information processing system according to the embodiment.

FIG. 3A is an explanatory diagram illustrating an example of data stored in a sound statistic database.

FIG. 3B is an explanatory diagram illustrating a column of "type information" extracted from FIG. 3A.

FIG. 4 is a flowchart illustrating an example of control operation performed by an information processing system according to the embodiment.

FIG. 5 is a block diagram illustrating an internal configuration of an information processing system according to a second embodiment of the present disclosure.

MODE(S) FOR CARRYING OUT THE INVENTION

Figure 1:
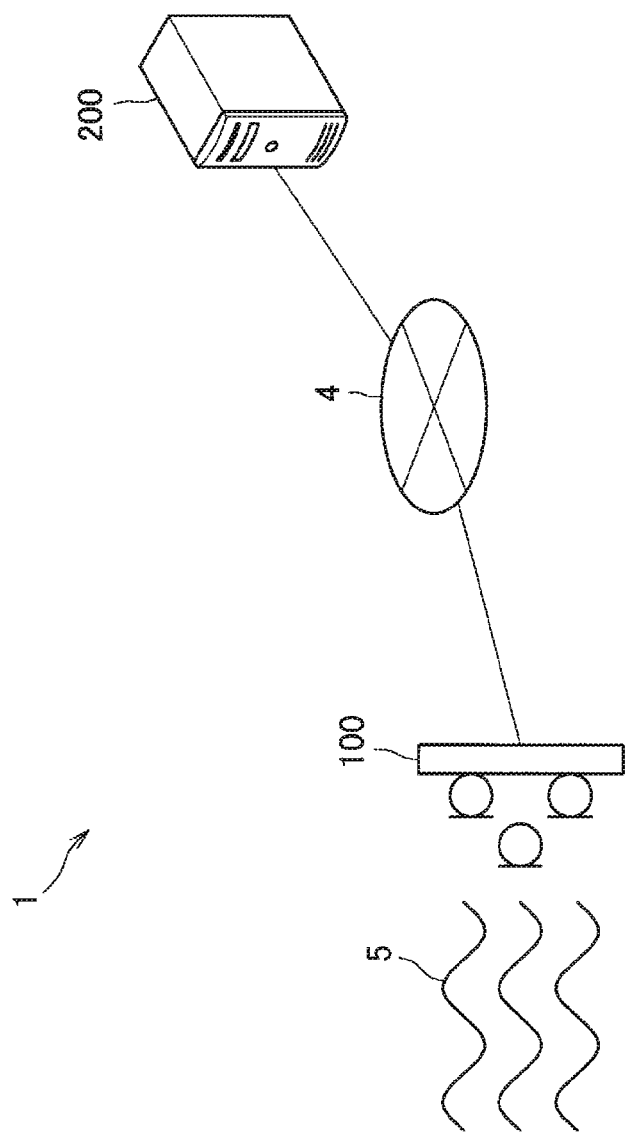
FIG. 1 is an explanatory diagram illustrating an overview of an information processing system according to a first embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that, the description is given in the following order.
1. First embodiment
1.1. Overview of information processing system
1.2. Internal configuration example of information processing system
1.3. Control example of information processing system
2. Second embodiment
2.1. Internal configuration example of information processing system
2.2. Control example of information processing system
3. Third embodiment
3.1. Internal configuration example of information processing system
3.2. Control example of information processing system
3.3. Display example of information processing system
4. Hardware configuration example
5. Conclusion

1. First Embodiment

[1.1. Overview of Information Processing System]

First, with reference to FIG. 1, an overview of an information processing system including an information processing device according to a first embodiment of the present disclosure will be described. FIG. 1 is an explanatory diagram illustrating an overview of an information processing system 1 according to the embodiment.

As illustrated in FIG. 1, the information processing system 1 includes a terminal device 100 or the like and an information processing device 200 according to the embodiment. The terminal device 100 is configured to acquire sounds 5. In addition, the terminal device 100 or the like and the information processing device 200 are connected via a network 4.

The terminal device 100 acquires sounds 5 in a predetermined space, and generates sound signal data. In addition, the terminal device 100 may acquire spatiotemporal information in the predetermined space at the time of acquisition of the sounds 5. For example, the terminal device 100 may be a recording device (such as a microphone device) capable of converting the sounds 5 into the sound signal data, or may be a terminal device capable of acquiring the sound signal data of the sounds 5 from an externally-connected recording device.

Here, the predetermined space means an enclosed space or an open space that have certain regions. Specifically, the enclosed space is a space surrounded by a window, a door, a floor, a ceiling, a wall, a structural member, or the like. For example, the enclosed space is an internal space of a building, a room, a vehicle, or the like. On the other hand, the open space means a region in an outside world that is not surrounded by a window, a door, a floor, a ceiling, a wall, a structural member, or the like.

The sound 5 may be an environmental sound in a predetermined space, for example. Specifically, the environmental sound is a sound caused by an environment of the predetermined space. The environmental sound can be acquired involuntarily in the case where the recording device or the like is placed in the predetermined space.

In addition, for example, the spatiotemporal information in the predetermined space includes information on a position of the predetermined space and information on a time when the sound 5 is acquired. More specifically, the spatiotemporal information is information including positional information such as a latitude and a longitude of the predetermined space and temporal information such as year, date, and time when the sound 5 is acquired.

By using the sound signal data of the sounds 5 acquired from the terminal device 100 or the like, the information processing device 200 extracts various kinds of feature amounts of the sounds 5 and identifies types of sounds included in the sounds 5 on the basis of the extracted feature amounts. In addition, the information processing device 200 acquires spatiotemporal information in the predetermined space at the time of acquisition of the sounds 5, generates sound statistic information in association with types of sounds included in the sounds 5, the various kinds of extracted feature amounts, and spatiotemporal information in the predetermined space, and establishes a sound statistic database. Note that, the sound signal data of the sounds 5 may be acquired from a recording device, a storage device, or the like instead of the terminal device 100. In addition, the spatiotemporal information of the predetermined space at the time of acquisition of the sounds 5 may be acquired from the recording device, the storage device, or the like instead of the terminal device 100.

The network 4 is a communication network that enables communication between the terminal device 100 or the like and the information processing device 200. The network 4 may be a public network, a local area network (LAN), a wide area network (WAN), or the like, the public network including the Internet, a satellite communication network, a telephone network, and the like.

By using the above described configuration, it is possible for the information processing device 200 according to the embodiment to establish a sound statistic database in which spatiotemporal information of a predetermined space is associated with types and feature amounts of sounds heard in the predetermined space.

By using such a sound statistic database, for example, a user can recognize an environmental sound or an atmosphere in a designated space in advance, estimate change in an environment in a designated space from change in environmental sounds, and search for a space with an environmental sound or an atmosphere that the user want.

In addition, the information processing device 200 according to the embodiment does not accumulate raw sounds 5 acquired in the predetermined space in the database, but accumulates types of identified sounds and extracted feature amounts in the database. Therefore, even in the case where the acquired sounds 5 include information on privacy such as conversational voice from which an individual can be identified, it is possible to convert the sounds 5 into information from which an individual cannot be identified, and accumulate the information in the sound statistic database without collecting information on privacy.

Accordingly, for example, such a sound statistic database can be used for searching for a piece of real estate, a shop, a hospital, an accommodation, or the like in view of environmental sounds, an atmosphere, and the like, for recognizing environmental sounds and an atmosphere of a piece of real estate, a shop, a hospital, an accommodation, or the like in advance, or for recognizing distribution of sounds in a region, a building, a vehicle, an event space, or the like. Therefore, by using the information processing device 200 according to the embodiment, it is possible to establish a sound statistic database with high usability and high possibility of application.

Especially, the sound statistic database established by the information processing device 200 according to the embodiment is suitable for searching for and referring to a piece of real estate, a shop, or the like whose environmental sounds and atmosphere are important factors for selection.

[1.2. Internal Configuration Example of Information Processing System]

Next, with reference to FIG. 2, an internal configuration example of the information processing system 1 according to the embodiment will be described. FIG. 2 is a block diagram illustrating the internal configuration of the information processing system 1 according to the embodiment.

As illustrated in FIG. 2, for example, the information processing system 1 according to the embodiment includes the terminal device 100 or the like and the information processing device 200 that is connected with the terminal device 100 via the network 4.

(Terminal Device)

The terminal device 100 includes a sound acquisition unit 110, an information acquisition unit 120, and an upload unit 130.

The sound acquisition unit 110 acquires sounds 5 in a predetermined space as sound signal data. For example, the sound acquisition unit 110 may be a recording device such as a microphone device configured to convert sound energy into electrical energy, or may be a connection interface configured to acquire the sound signal data from an externally-connected recording device.

Note that, in the case where the sound acquisition unit 110 is the recording device, it is preferable that the sound acquisition unit 110 be a microphone array device including a plurality of microphones. In this case, the sound acquisition unit 110 can acquire information on the sounds 5 more than a single microphone device that includes only one microphone. For example, in the case where the sound acquisition unit 110 is the microphone array device, it is possible for the sound acquisition unit 110 to additionally acquire information on cardinal directions of sound sources of the sounds 5 by using MUltiple SIgnal Classification (MUSIC).

The information acquisition unit 120 acquires spatiotemporal information in the predetermined space at the time of acquisition of a sound. Specifically, the information acquisition unit 120 acquires positional information such as a latitude, a longitude, an address, and an altitude above the ground of the predetermined space, and temporal information such as date, day, and a time slot when the sound 5 is acquired. In addition, the information acquisition unit 120 may acquire weather information at the time of acquisition of a sound, information on an opening degree of a window, a door, or the like in the predetermined space, or the like. In the case where the sound acquisition unit 110 is the microphone array device, the information acquisition unit 120 may further acquire information on a cardinal direction of a sound source of a sound.

Note that, the information acquisition unit 120 may acquire such information on the basis of a result of measurement performed by various sensors included in the terminal device 100, or may automatically acquire such information from another database or the like via the network 4, or may acquire such information on the basis of user input.

The upload unit 120 transmits information to the information processing device 200 via the network 4. Specifically, the upload unit 120 transmits, to the information processing device 200, sound signal data acquired by the sound acquisition unit 110 and spatiotemporal information of the predetermined space at the time when the information acquisition unit 120 has acquired the sound. Note that, the upload unit 130 may include any communication device as long as the communication device is capable of connecting with the network 4. For example, the upload unit 130 may include a communication device supporting a wired LAN or a wireless LAN, a wired communication device that performs communication in a wired manner, or the like.

(Information Processing Device)

The information processing device 200 includes a communication unit 210, a feature amount extraction unit 220, an identification unit 230, an information combining unit 240, a database establishing unit 250, and a sound statistic database 260.

The communication unit 210 receives information from the terminal device 100 via the network 4. Specifically, the communication unit 210 receives the sound signal data acquired by the sound acquisition unit 110 of the terminal device 100, and the spatiotemporal information of the predetermined space at the time when the information acquisition unit 120 of the terminal device 100 has acquired the sound 5. Note that, the communication unit 210 may include any communication device as long as the communication device is capable of connecting with the network 4. For example, the communication unit 210 may include a communication device supporting a wired LAN or a wireless LAN, a wired communication device that performs communication in a wired manner, or the like. In addition, needless to say, the communication unit 210 can receive the sound signal data of the sound 5 and the spatiotemporal information of the predetermined space at the time of acquisition of the sound 5, from a device other than the terminal device 100.

The feature amount extraction unit 220 extracts various kinds of feature amounts from the sound signal data per unit time. For example, from the sound signal data, the feature amount extraction unit 220 may extract any combination of feature amounts such as a sound pressure, a spectrum envelope form, a zero-crossing number, a pitch, an autocorrelation function, and the mel-frequency cepstrum (MFCC) per unit time. In addition, in the case where the sound signal data is acquired by the microphone array device, the feature amount extraction unit 220 may further extract information on a cardinal direction of a sound source.

The identification unit 230 identifies types of sounds included in the sound signal data on the basis of the feature amounts of the sound signal data extracted by the feature amount extraction unit 220. Specifically, the identification unit 230 sets the plurality of types of sounds in advance, and identifies which type the sounds included in the sound signal data is classified into on the basis of the feature amounts of the sound signal data extracted by the feature amount extraction unit 220. Here, examples of the types of sounds identified by the identification unit 230 include human voice, music, automobile traffic noise, train noise, airplane noise, voice of animals such as a dog, cat, and birds, and sound occurring when objects hit by each other.

More specifically, the identification unit 230 inputs a combination of the feature amounts of the sound signal data extracted by the feature amount extraction unit 220, to a classifier taught in advance, as a multi-dimensional vector. Next, by using the classifier, the identification unit 230 outputs a score indicating a degree of possibility that a sound included in the sound signal data is classified into each type, per predetermined time period, and determines that a sound of a type with a high score is a sound included in the sound signal data.

Note that, various known classifiers can be used as the classifier used by the identification unit 230. For example, as the identification unit 230, a classifier using a neural network, a classifier using a support vector machine, or the like can be used.

The information combining unit 240 generates sound statistic information in which the feature amounts extracted from the sound signal data, the type of the sound included in the sound signal data, and spatiotemporal information of the predetermined space at the time of acquisition of the sound are associated with each other. For example, the information combining unit 240 generates sound statistic information in which year, date, day, and a time slot of a time of acquisition of the sound, the maximum, average, and minimum sound pressures of the sound, and the maximum, average, and minimum sound pressures of a sound included in the sound signal data for each type are associated with each other. Alternatively, the information combining unit 240 may generate sound statistic information in which weather, a cardinal direction of a sound source, information on an opening degree of a window, a door, or the like in the predetermined space, and the like are associated with each other in addition to the feature amounts, types of sounds, and spatiotemporal information described above.

Note that, it is preferable that the information combining unit 240 do not include sound signal data in the sound statistic information. This is because the sound signal information may include information on privacy such as conversational voice from which an individual can be identified.

The database establishing unit 250 establishes the sound statistic database 260 by using the sound statistic information. Specifically, the database establishing unit 250 sequentially adds sound statistic information generated by the information combining unit 240 to the sound statistic database 260. Note that, the sound statistic database 260 may be established in a storage device in the information processing device 200 such as a hard disk drive (HDD) device, a solid state drive (SSD) device, or flash memory.

Next, with reference to FIG. 3A and FIG. 3B, an example of sound statistic information stored in the sound statistic database 260 will be described. FIG. 3A is an explanatory diagram illustrating the example of data stored in the sound statistic database 260. FIG. 3B is an explanatory diagram illustrating a column of "type information" extracted from FIG. 3A.

As illustrated in FIG. 3A, IDs are allocated to respective pieces of sound statistic information stored in the sound statistic database 260. The respective pieces of sound statistic information are stored in association with "latitude", "longitude", and "indoor position" that are positional information of predetermined spaces in which sounds are acquired, and "year/month/date", "day" and "time slot" that are temporal information indicating time of acquisition of sounds. In addition, the sound statistic information may further include "weather" at the time of acquisition of sounds, "sound source cardinal direction information" that is information on cardinal directions of sound sources. Note that, in FIG. 3A, the "indoor position" indicates floor numbers of buildings. For example, "−1" indicates a first basement, and "0" indicates a rooftop.

In addition, sound pressures of sounds are stored in "sound pressure information" (for example, average sound pressure) of the sound statistic information, as time series numerical data (so-called log data) per predetermined time period. In addition, as illustrated in FIG. 3B, sound pressures (for example, average sound pressure) of sounds are stored by each type of sounds in "type information", as time series numerical data (so-called log data) per predetermined time period. The "type information" is information on types of sounds. In addition, in a way similar to the "type information", sound pressures (for example, average sound pressure) of sounds are stored by each type and cardinal direction of sounds in "sound source cardinal direction information", as numerical data (so-called log data) per predetermined time period. The "sound source cardinal direction information" is information on cardinal directions of sound sources. Note that, for example, the cardinal directions may be set such that cardinal directions in a clockwise direction (positive direction) are set by using angles from 0° to 360° while the "north" is set to 0°.

Note that, in FIG. 3A and FIG. 3B, the numerical values of average sound pressures are illustrated in the "sound pressure information", "type information", and "sound source cardinal direction information". However, the technology according to the present disclosure is not limited thereto. For example, the sound pressure information", "type information", and "sound source cardinal direction information" may be numerical values such as "maximum sound pressure", "minimum sound pressure", or the like. In addition, any unit can be used as a unit of the sound pressure, such as decibel (dB), sone, or phon.

By using the above described configuration, it is possible for the information processing device 200 according to the embodiment to establish the sound statistic database 260 in which spatiotemporal information of a predetermined space is associated with types and feature amounts of sounds heard in the predetermined space.

Note that, the information processing device 200 including the feature amount extraction unit 220, the identification unit 230, and the information combining unit 240 has been described above. However, the technology according to the present disclosure is not limited thereto. For example, the terminal device 100 may include the feature amount extraction unit 220. Alternatively, the terminal device 100 may include the feature amount extraction unit 220 and the identification unit 230, or the terminal device 100 may include the feature amount extraction unit 220, the identification unit 230, and the information combining unit 240. Note that, since the feature amount extraction unit 220 and the identification unit 230 requires a large information processing amount, it is preferable that they be included in the information processing device 200 that has a relatively high information processing performance.

[1.3. Control Example of Information Processing System]

Next, with reference to FIG. 4, a control example of the information processing system 1 according to the embodiment will be described. FIG. 4 is a flowchart illustrating an example of control operation performed by the information processing system 1 according to the embodiment.

As illustrated in FIG. 4, first, sounds are recorded by the microphone device or the like (S100). Next, the sound acquisition unit 110 determines whether the recording is finished (S110). In the case where the recording is finished (YES in S110), sound signal data of the recorded sounds is acquired. On the other hand, in the case where the recording is not finished (NO in S110), the recording continues (S100).

Next, the information acquisition unit 120 acquires temporal information at the time of recording sounds and spatial information of a space in which the sounds are recorded (S120). In addition, it is also possible for the information acquisition unit 120 to acquire other information such as weather information and information on cardinal directions of sound sources. Next, the upload unit 130 transmits sound signal data, temporal information at the time of recording, and spatial information of the space in which the recording is carried out, to the information processing device 200 (S130).

The feature amount extraction unit 220 extracts feature amounts from the received sound signal data (S140), and the identification unit 230 identifies types of sounds included in the sound signal data by using the feature amounts extracted by the feature amount extraction unit 220 (S150). Next, the information combining unit 240 generates sound statistic information in which the sound signal data, the types of the identified sounds, and spatiotemporal information at the time of recording are associated with each other (S160). Note that, it is also possible for the information combining unit 240 to generate sound statistic information in which other information such as weather information and information on cardinal directions of sound sources are additionally associated with each other. In addition, the database establishing unit 250 stores the sound statistic information in the sound statistic database 260 (S170).

Under such control, it is possible for the information processing device 200 according to the embodiment to establish the sound statistic database 260 in which spatiotemporal information of a predetermined space is associated with types and feature amounts of sounds heard in the predetermined space.

2. Second Embodiment

[2.1. Internal Configuration Example of Information Processing System]

Next, with reference to FIG. 5, an information processing system 2 including an information processing device according to a second embodiment of the present disclosure will be described. FIG. 5 is a block diagram illustrating the internal configuration of the information processing system 2 according to the embodiment.

As illustrated in FIG. 5, the information processing system 2 according to the embodiment includes a terminal device 100A and the information processing device 200 that is connected with the terminal device 100A via the network 4. In addition, the terminal device 100A includes the sound acquisition unit 110, a preprocessing unit 140, the information acquisition unit 120, and the uploading unit 130. The information processing device 200 includes the communication unit 210, the feature amount extraction unit 220, the identification unit 230, the information combining unit 240, the database establishing unit 250, and the sound statistic database 260.

In other words, the information processing system 2 according to the embodiment is different from the information processing system 1 according to the first embodiment in that the terminal device 100A further includes the preprocessing unit 140 and sound signal data acquired by the information processing device 200 is subjected to preprocessing such as noise elimination. Note that, the structural elements other than the preprocessing unit 140 are substantially similar to the structural elements in the information processing system 1 according to the first embodiment. Therefore, repeated description is omitted here.

The preprocessing unit 140 determines a noise section including noise from sound signal data acquired by the sound acquisition unit 110, and eliminates the noise section. In addition, the preprocessing unit 140 may correct difference in sound volume (sound pressure level) depending on a microphone device that has recorded a sound 5.

Here, examples of the noise included in the sound signal data include wind sound, vibration sound of a recording device, and the like. For example, in the case where the predetermined space is a piece of real estate and recording is carried out at a time of vising and viewing the piece of real estate such as private viewing, noise such as wind sound and vibration sound of the recording device is likely to be included in the sound signal data clearly. By using the information processing system 2 according to the embodiment, it is possible to acquire an environmental sound or the like in a predetermined space by performing the preprocessing for eliminating a noise section from the sound signal data even in the case where it is impossible to prepare an environment with low noise. Therefore, it is possible to efficiently acquire sounds in a predetermined space even in the case where it is necessary to carry out recording simultaneously with another matter in the predetermined space.

For example, in the case where the preprocessing unit 140 detects the wind sound, the wind sound is in a low tone range. Therefore, the preprocessing unit 140 may determine that a section in which sounds are concentrated in a low tone range is a section including the wind sound. In addition, in the case where the sound signal data is recorded by a microphone array device, waveforms and the like of wind sounds recorded by respective microphones are not correlated to each other, but waveforms and the like of environmental sounds recorded by respective microphones are correlated to each other. Therefore, the preprocessing unit 140 may determine that a section with low correlation between the microphones is the section including the wind sounds.

Alternatively, for example, in the case where the preprocessing unit 140 detects the vibration sound, a vibration sensor, an acceleration sensor, or the like may be provided in the recording device, and the preprocessing unit 140 may determine that a section in which vibration of the recording device is detected is a section including the vibration sound. Alternatively, the preprocessing unit 140 may determine a section including the vibration sound from the sound signal data without using the vibration sensor or acceleration sensor.

Examples of the vibration sensor may include various types of vibration sensors such as a capacitance type sensor, an eddy-current sensor, a laser Doppler sensor, a piezoelectric element sensor, and an electromagnetic sensor. In addition, examples of the acceleration sensor may include various types of vibration sensors such as a mechanical displacement measurement sensor, an optical sensor, a capacitance type sensor, and a piezo resistance type sensor. Note that, vibration detection accuracy of the preprocessing unit 140 can be further improved by using the vibration sensor and the acceleration sensor in combination.

In addition, if necessary, the preprocessing unit 140 may determine a noise section including noise other than the wind sound or the vibration sound of the recording device, and may eliminate the noise section. For example, the preprocessing unit 140 may determine a section including voice or footstep sound of a person who is carrying out recording in a predetermined space, and may eliminate the section.

Note that, it is preferable that the terminal device 100A include the preprocessing unit 140. In this case, it is possible for the terminal device 100A to eliminate a noise section including noise that is not used for extracting feature amounts or identifying sound types, and transmit only useful sound signal data to the information processing device 200. Therefore, it is possible for the terminal device 100A to efficiently perform recording in a predetermined space.

For example, by using the information processing system 2 according to the embodiment, it is possible to efficiently acquire environmental sounds or the like in a predetermined space even in the case where the predetermined space is a piece of real estate and it is necessary to carry out recording simultaneously with another matter such as a private viewing in the predetermined space.

[2.2. Control Example of Information Processing System]

Figure 6:
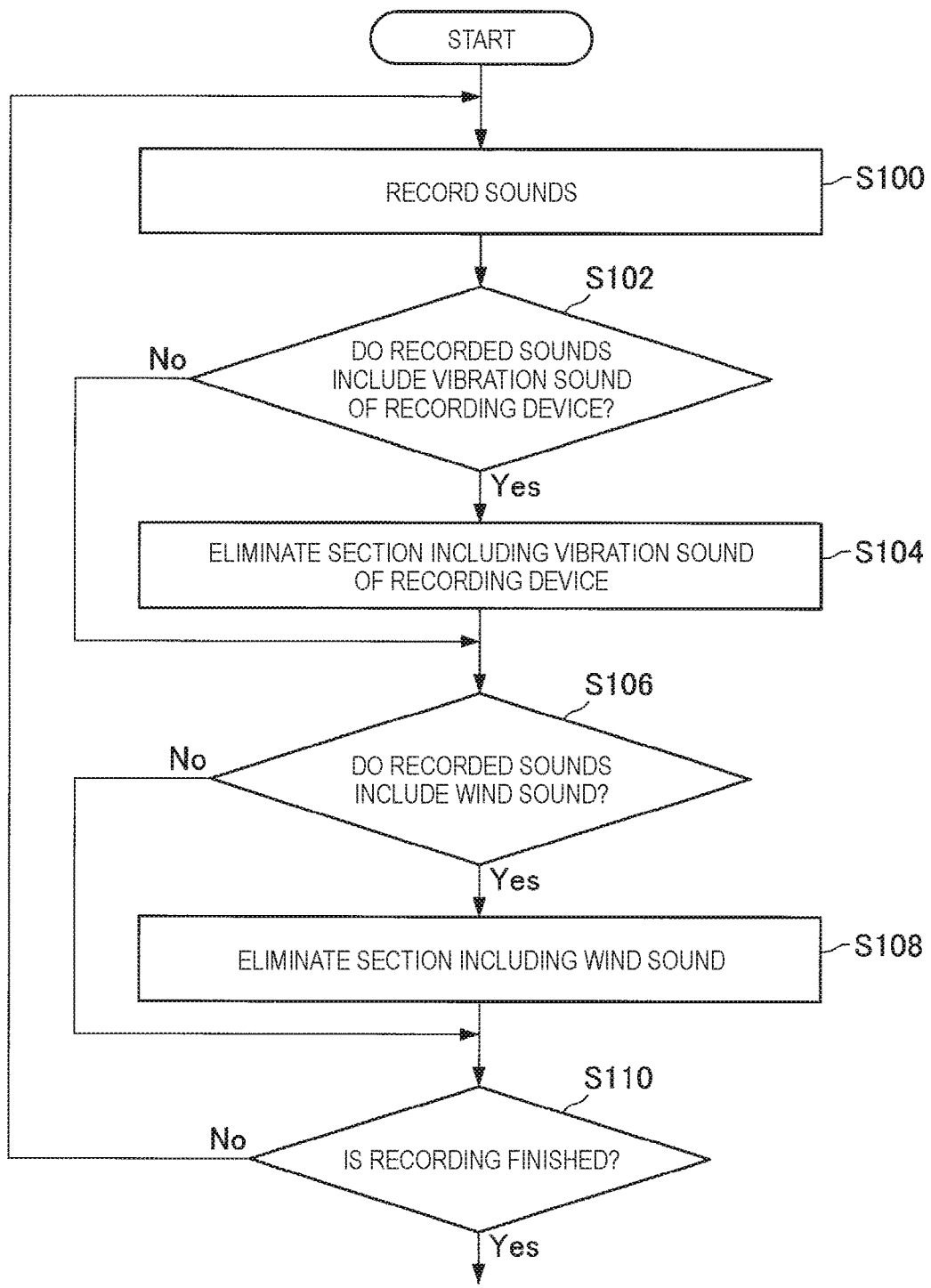
FIG. 6 is a flowchart illustrating a part of control operation performed by an information processing system according to the embodiment.

Next, with reference to FIG. 6, a control example of the information processing system 2 according to the embodiment will be described. FIG. 6 is a flowchart illustrating a part of control operation performed by the information processing system 2 according to the embodiment.

Note that, control operations from S100 to S110 performed by the information processing system 2 according to the embodiment are different from the first embodiment, but the control operations after S120 are similar to the first embodiment. Therefore, the control operation from S100 to S110 will be described below, and description of the control operation after S120 will be omitted.

As illustrated in FIG. 6, first, sounds are recorded by the microphone device or the like (S100). Next, the preprocessing unit 140 determines whether the recorded sounds include a vibration sound of the microphone device (S102). In the case where there is a section including the vibration sound of the microphone device (YES in S102), the preprocessing unit 140 eliminates the section (S104). Next, the preprocessing unit 140 determines whether the recorded sounds include a wind sound (S106). In the case where there is a section including the wind sound (YES in S106), the preprocessing unit 140 eliminates the section (S108). Next, the sound acquisition unit 110 determines whether the recording is finished (S110). In the case where the recording is finished (YES in S110), sound signal data of the recorded sounds is acquired. On the other hand, in the case where the recording is not finished (NO in S110), the recording continues (S100).

Note that, the order of S102 and S104 in which the noise section including the vibration sound is eliminated, and S106 and S108 in which the noise section including the wind sound is eliminated may be opposite from the above described order. In addition, in the case where the preprocessing unit 140 also determines a section including noise other than the wind sound or the vibration sound and eliminates the section, a step for determining the section including the noise and a step for eliminating the section may be further included in a stage before S110.

Under such control, the information processing device 200 according to the embodiment can acquire sound signal data from which the sections including noise are eliminated. Therefore, it is possible to efficiently establish the sound statistic database 260.

3. Third Embodiment

[3.1. Internal Configuration Example of Information Processing System]

Figure 7:
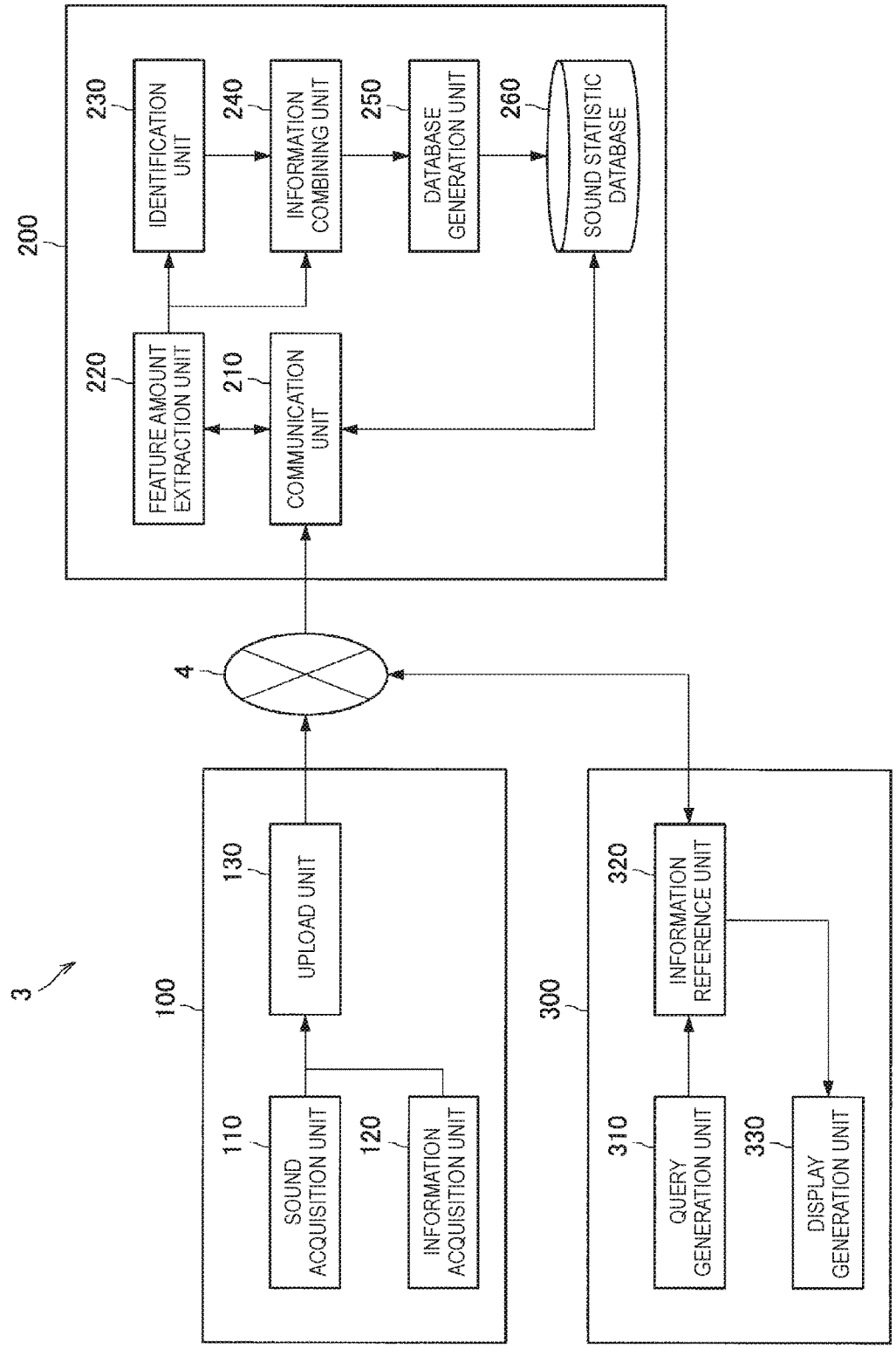
FIG. 7 is a block diagram illustrating an internal configuration of an information processing system according to a third embodiment of the present disclosure.

Next, with reference to FIG. 7, an information processing system 3 including an information processing device according to a third embodiment of the present disclosure will be described. FIG. 7 is a block diagram illustrating the internal configuration of the information processing system 3 according to the embodiment.

The information processing system 3 according to the third embodiment of the present disclosure further includes a reference device 300. Here, to search for a piece of real estate, a shop, or the like, the reference device 300 acquires a condition input by a user, acquires information that satisfies the condition from the sound statistic database 260, and presents acquired information to the user.

As illustrated in FIG. 7, the information processing system 3 according to the embodiment includes the terminal device 100, the information processing device 200, and the reference device 300. The information processing device 200 is connected with the terminal device 100 via the network 4, and the reference device 300 is connected with the information processing device 200 via the network 4. In addition, the reference device 300 includes a query generation unit 310, an information reference unit 320, and a display generation unit 330. Note that, the information processing device 200 may include the information reference unit 320 and the di splay generation unit 330.

In other words, the information processing system 3 according to the embodiment is different from the information processing system 1 according to the first embodiment in that it is possible for a user using the reference device 300 to refer to and search for information in the sound statistic database 260. Note that, the structural elements other than the query generation unit 310, information reference unit 320, or the display generation unit 330 in the reference device 300 are substantially similar to the structural elements in the information processing system 1 according to the first embodiment. Therefore, repeated description is omitted here.

The query generation unit 310 acquires an information reference request from a user, and generates a query to be transmitted to the information processing device 200. Specifically, the query generation unit 310 acquires conditions of sound statistic information which the user has requested to refer to such as a sound type, spatial information, temporal information, and the like, and generates a query to be transmitted to the information processing device 200 on the basis of the acquired conditions. Note that, for example, the conditions of the sound statistic information which the user can request to refer to may correspond to various items included in the sound statistic information stored in the sound statistic database 260.

The information reference unit 320 acquires sound statistic information which the user has requested to refer to. Specifically, via the network 4, the information reference unit 320 transmits a query generated by the query generation unit 310 to the information processing device 200, and acquires sound statistic information corresponding to the query from the sound statistic database 260. Note that, the information reference unit 320 may include any communication device as long as the communication device is capable of connecting with the network 4. For example, the information reference unit 320 may include a communication device supporting a wired LAN or a wireless LAN, a wired communication device that performs communication in a wired manner, or the like.

The display generation unit 330 generates display to be presented to a user on the basis of the statistic data acquired by the information reference unit 320 from the sound statistic database 260. The display generation unit 330 may display the statistic data acquired from the sound statistic database 260 in the form of a line chart, a histogram, a map diagram, or the like, to the user. Note that, an example of the display generated by the display generation unit 330 will be described later.

According to the above described configuration, the information processing device 200 according to the embodiment can provide the statistic data from the sound statistic database 260 in response to a request from a user, and provide sound statistic information to the user. Therefore, the user using the sound statistic database 260 can obtain desired information. Note that, the information processing device 200 may include the information reference unit 320 and the display generation unit 330 to generate display to be presented to a user in response to a received information reference request from the user and transmit the generated display to the reference device 300.

[3.2. Control Example of Information Processing System]

Figure 8:
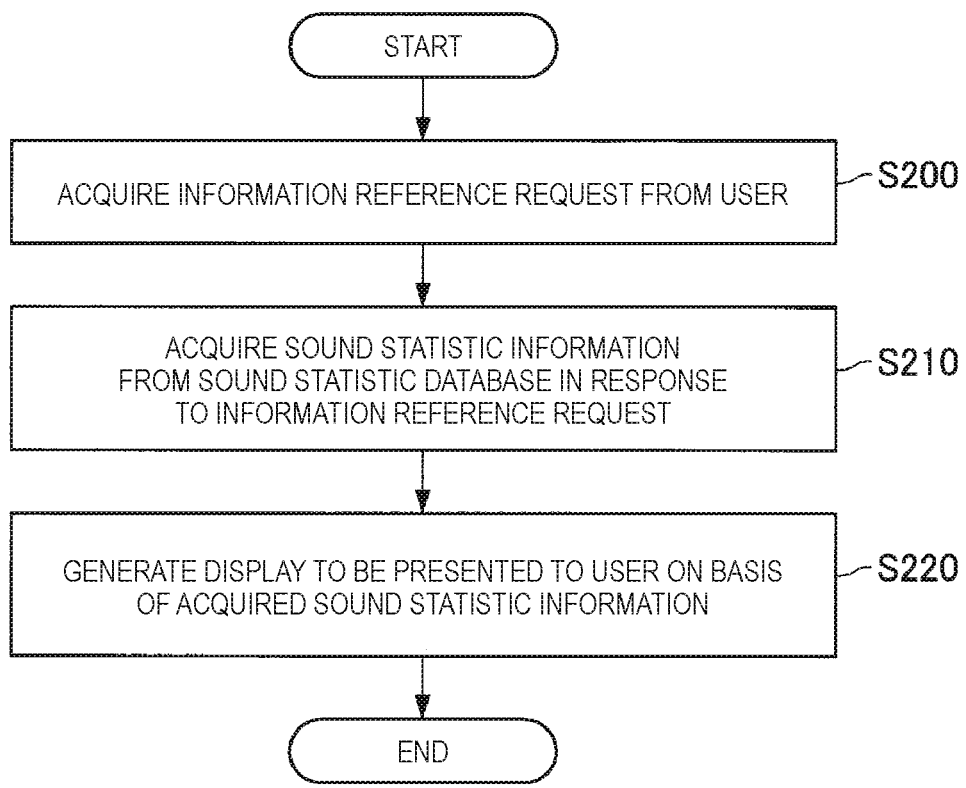
FIG. 8 is a flowchart illustrating a part of control operation performed by an information processing system according to the embodiment.

Next, with reference to FIG. 8, a control example of the information processing system 3 according to the embodiment will be described. FIG. 8 is a flowchart illustrating an example of control operation performed by the information processing system 3 according to the embodiment. Note that, FIG. 8 simply illustrates unique control performed by the reference device 300 according to the embodiment.

As illustrated in FIG. 8, first, the query generation unit 310 acquires a reference request from a user (S200). Next, the query generation unit 310 generates a query to be transmitted to the information processing device 200 on the basis of the reference request from the user, and the information reference unit 320 transmits the generated query to the information processing device 200 and acquires sound statistic information corresponding to the reference request from the sound statistic database (210). Next, the display generation unit 330 generates display to be presented to a user on the basis of the statistic data acquired by the information reference unit 320 from the sound statistic database 260 (S220).

Under such control, the information processing system 3 can present, to the user, the sound statistic information corresponding to the reference request from the user.

[3.3. Display Example of Information Processing System]

Next, with reference to FIG. 9 to FIG. 13, the display example showing sound statistic information generated by the display generation unit 330 will be described. FIG. 9 to FIG. 13 are each an explanatory diagram illustrating a display example showing sound statistic information. Note that, display examples described below are mere examples. Display generated by the reference device 300 in the information processing system 3 according to the embodiment is not limited to the following display examples.

Figure 9:
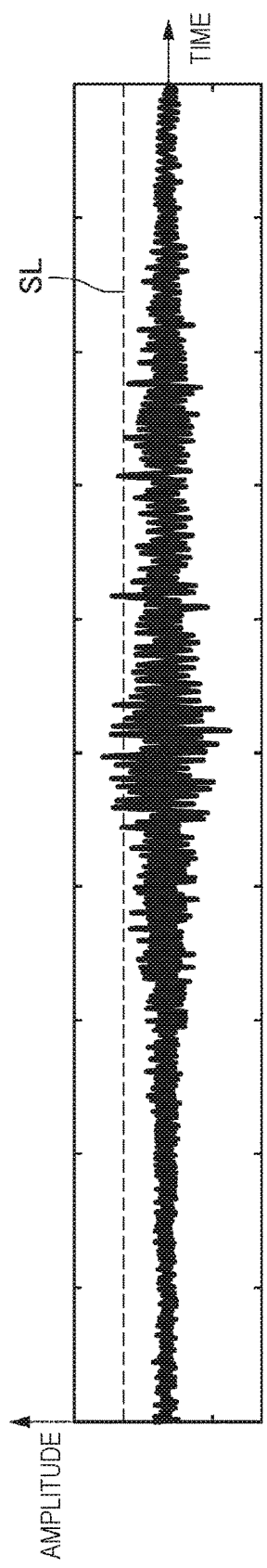
FIG. 9 is an explanatory diagram illustrating a display example showing sound statistic information.

For example, the display generation unit 330 may display the sound statistic information to the user in the form of a graph illustrated in FIG. 9. In this case, the display generation unit 330 can present time transition of sound pressure of a certain sound type to a user. In addition, the graph can show a standard value line SL indicating a legal standard value or a comparative standard value. Note that, the display generation unit 330 may display time transition of the sound pressures of a plurality of sound types in a single graph.

Figure 10:
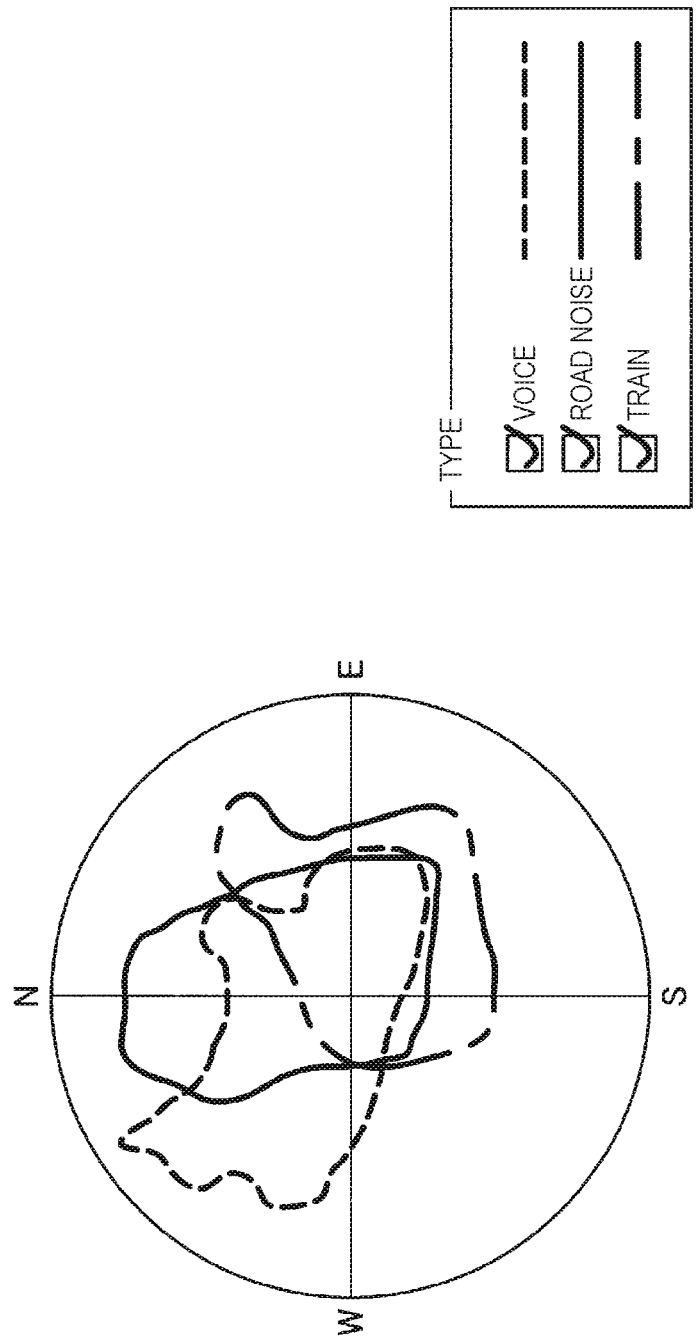
FIG. 10 is an explanatory diagram illustrating a display example showing sound statistic information.

Alternatively, the display generation unit 330 may present the sound statistic information to the user in the form of a radar chart as illustrated in FIG. 10. In this case, the display generation unit 330 can present, to a user, cardinal directions of sounds of respective types in a predetermined space. Thereby, the user can estimate cardinal directions of sound sources of the sounds of the respective types. Note that, in FIG. 10, "N" represents the north, "E" represents the east, "S" represents the south, and "W" represents the west.

Figure 11:
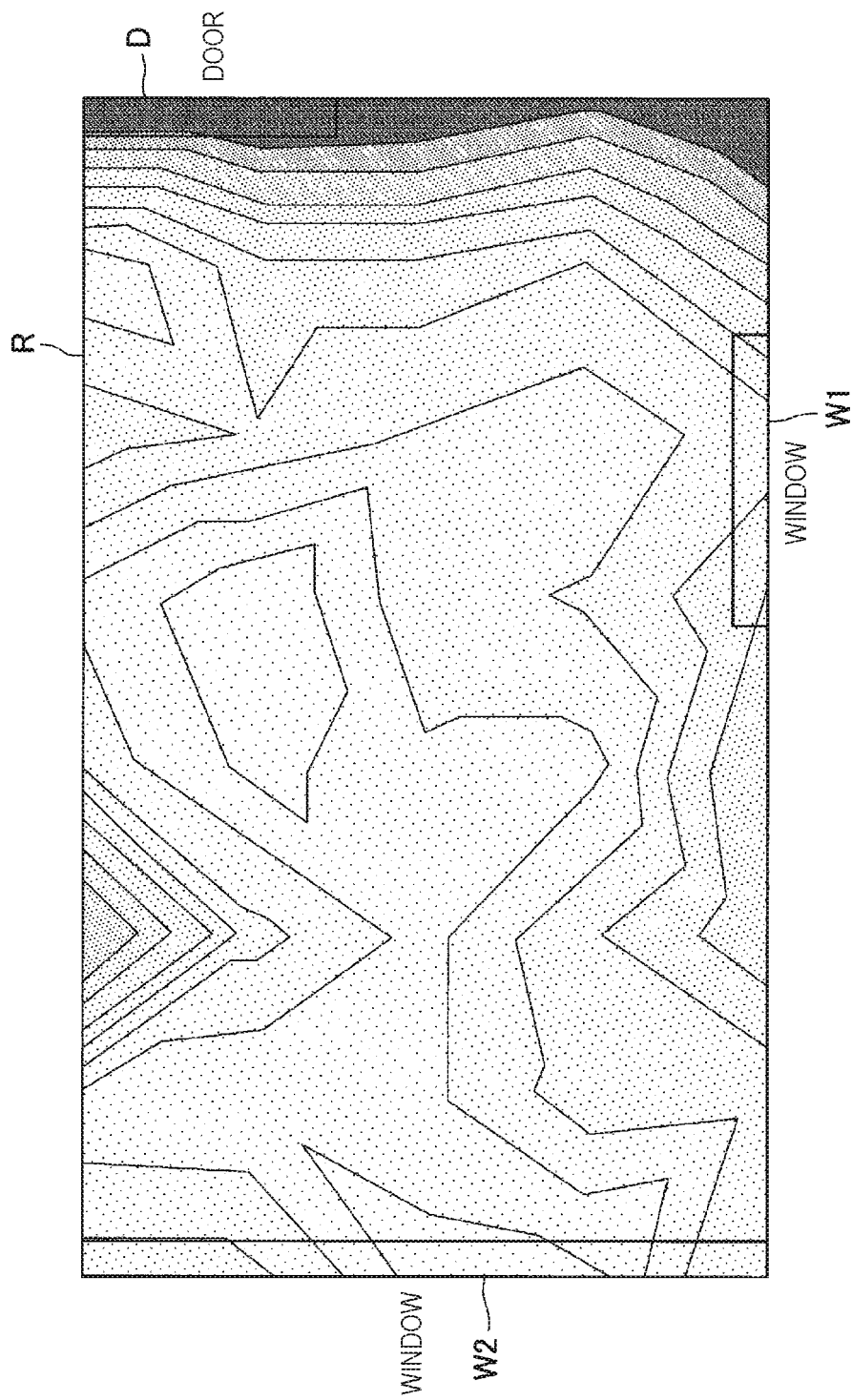
FIG. 11 is an explanatory diagram illustrating a display example showing sound statistic information.

Alternatively, the display generation unit 330 may present the sound statistic information to the user in the form of a color map as illustrated in FIG. 11. In this case, the display generation unit 330 can present, to a user, sound pressures of positions in a predetermined space by using color variation. For example, as illustrated in FIG. 11, the user can visually recognize a position with a high sound pressure in a room R with reference to the color variation with regard to arrangement of a door D, windows W1 and W2 in the room R.

Figure 12:
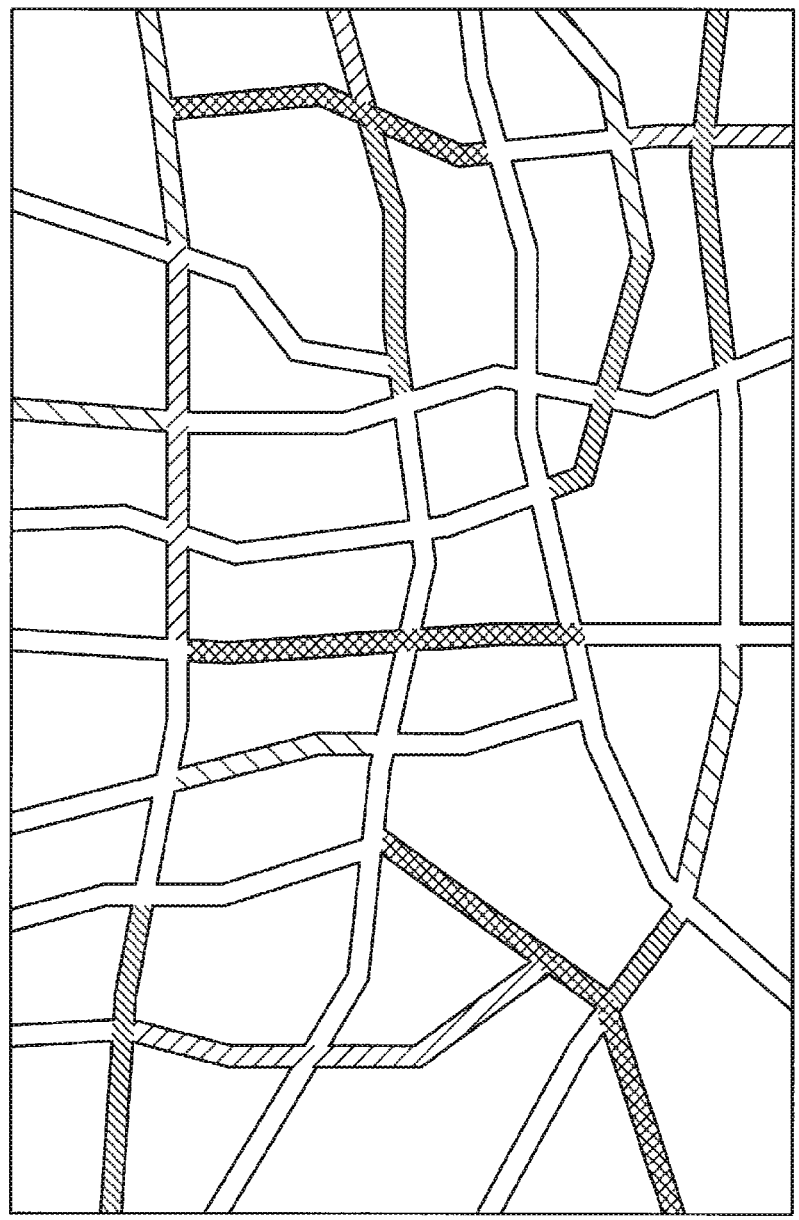
FIG. 12 is an explanatory diagram illustrating a display example showing sound statistic information.

Alternatively, the display generation unit 330 may present the sound statistic information to the user in the form of a map diagram in which roads are color-coded as illustrated in FIG. 12. In this case, the display generation unit 330 can present, to a user, a road with a high sound pressure by using color variation. Thereby, the user can estimate traffic amounts and degrees of busyness of the respective roads.

Figure 13:
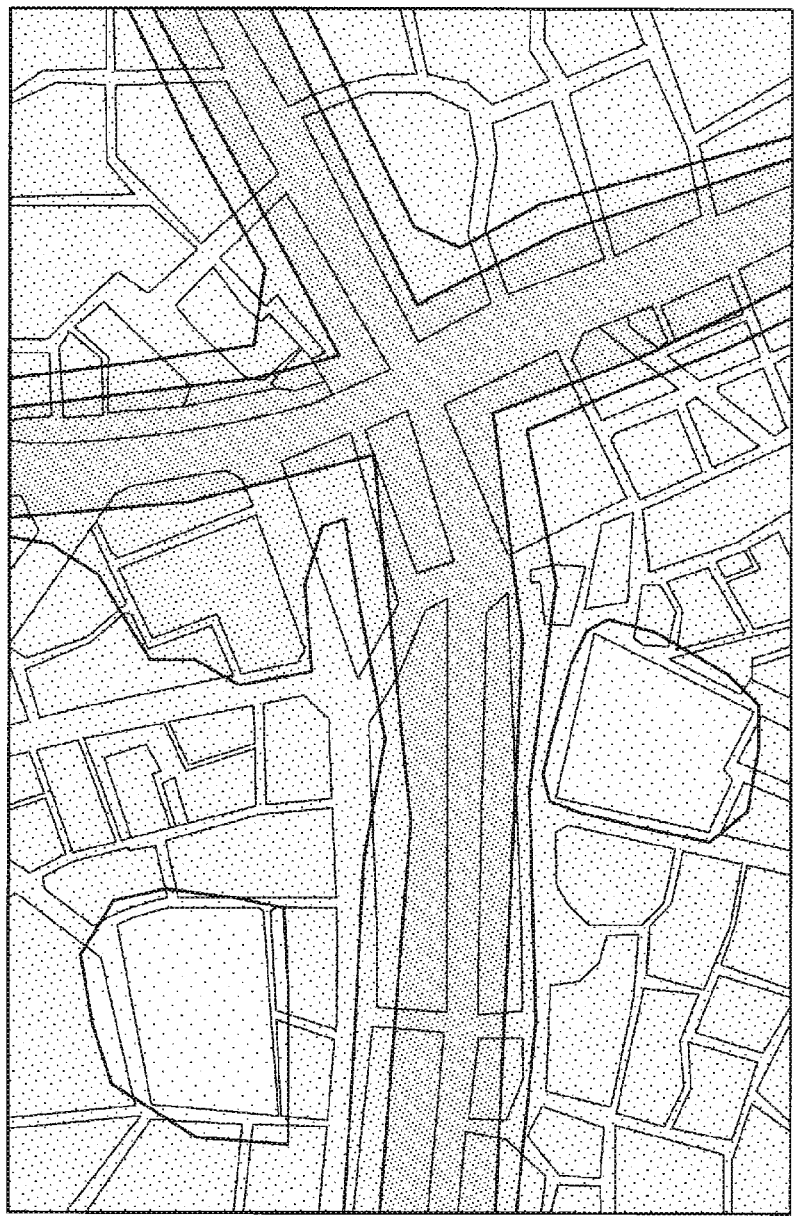
FIG. 13 is an explanatory diagram illustrating a display example showing sound statistic information.

Alternatively, the display generation unit 330 may present the sound statistic information to the user in the form of a map diagram in which parts of a map are color-coded as illustrated in FIG. 13. In this case, the display generation unit 330 can present, to a user, a region with a high sound pressure in a certain area by using color variation. For example, as illustrated in FIG. 13, the user can visually recognize that a region near roads has a high sound pressure with reference to color variation.

4. Hardware Configuration Example

Figure 14:
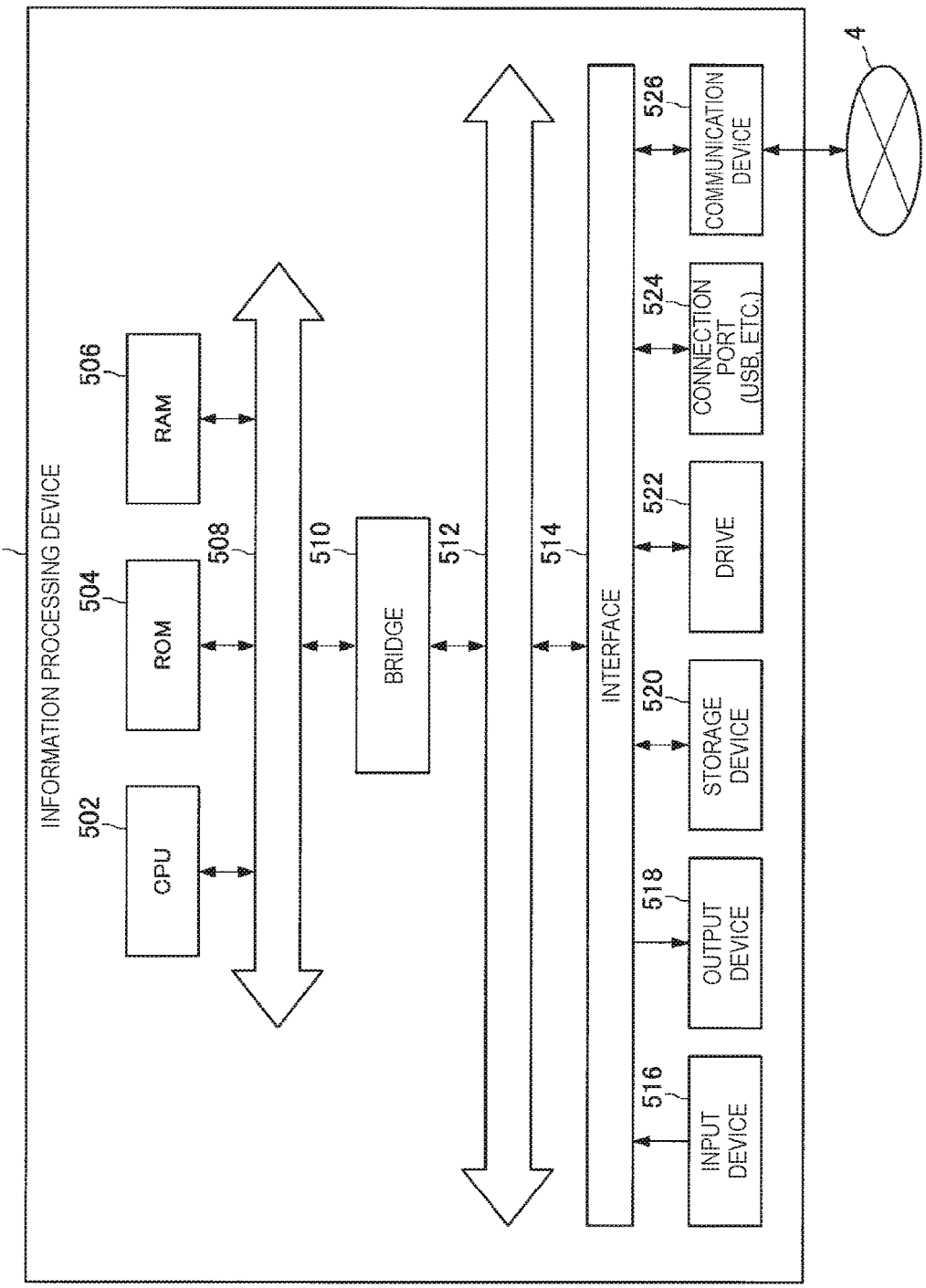
FIG. 14 is a block diagram illustrating a hardware configuration of an information processing device according to each embodiment of the present disclosure.

Next, with reference to FIG. 14, a hardware configuration of an information processing device according to each of the embodiments of the present disclosure will be described. FIG. 14 is a block diagram illustrating a hardware configuration example of an information processing device 500 that implements the information processing devices according to each of the embodiments of the present disclosure. Note that, the information process performed by the information processing device according to each of the embodiment of the present disclosure is achieved by operating cooperatively software and hardware.

As illustrated in FIG. 14, the information processing device 500 includes a central processing unit (CPU) 502, read only memory (ROM) 504, random access memory (RAM) 506, a bridge 510, internal buses 508 and 512, an interface 514, an input device 516, an output device 518, a storage device 520, a drive 522, a connection port 524, and a communication device 526.

The CPU 502 functions as an arithmetic processing unit and a control device to control all of the operating processes in the information processing device 500 in accordance with a program stored in the ROM 504 or the like. The ROM 504 stores programs and arithmetic parameters used by the CPU 502. The RAM 506 transiently stores programs used when the CPU 502 is executed, and parameters and the like that change as appropriate when executing such programs.

The CPU 502, the ROM 504, and the RAM 506 are connected with each other via the bridge 510, and the internal buses 508 and 512, and the like. Via the interface 514, the CPU 502, the ROM 504, and the RAM 506 are connected with the input device 516, the output device 518, the storage device 520, the drive 522, the connection port 524, and the communication device 526.

The input device 516 may be constituted by: an input device into which information is input, such as a touchscreen, a keyboard, a button, a microphone, a switch, or a lever; an input control circuit configured to generate an input signal on the basis of user input and to output the signal to the CPU 502; and the like. In addition, the input device 516 may include various sensors such as a vibration sensor, an acceleration sensor, a global navigation satellite system (GNSS) sensor, a geomagnetic sensor, a barometric sensor, and a temperature sensor.

For example, the output device 518 includes a liquid crystal display (LCD) device, an organic electroluminescent display (OLED) device, or a display device such as a lamp. Further, the output device 518 may include a sound output device such as a speaker or headphones. For example, the display device displays a generated image, and the sound output device converts sound data or the like into sound and outputs the sound.

The storage device 520 is a device for data storage that is an example of a storage unit of the information processing device 500. The storage unit 520 may include a storage medium, a storage device which stores data in the storage medium, a reader device which reads data from the storage medium, and a deletion device which deletes data stored in the storage medium.

The drive 522 is a reader/writer for the storage medium, and is incorporated in or externally attached to the information processing device 500. The drive 522 reads information stored in a removable recording medium that is mounted such as semiconductor memory, and outputs the information to the RAM 506. It is also possible for the drive 522 to write information to the removable storage medium.

The connection port 524 is a connection interface including a Universal Serial Bus (USB) port and a connection port for connecting an externally connected device such as an optical audio terminal.

The communication device 526 is, for example, a communication interface including a communication device or the like for connection to the network 4 such as a public line network or a dedicated line network. The communication device 526 may be a wireless LAN compatible communication device, or may be a cable communication device performing cable communication in a wired manner.

In addition, it is also possible to create a computer program for causing a hardware such as the CPU, the ROM, and the RAM to execute functions equivalent to the configurations of the information processing device that implements the information processing device according to each of the embodiments of the present disclosure. Moreover, it may be possible to provide a storage medium having the computer program stored therein.

5. Conclusion

As described above, by using the information processing device according to each of the embodiments of the present disclosure, it is possible to establish the sound statistic database in which spatiotemporal information of a predetermined space is associated with types and feature amounts of sounds heard in the predetermined space.

For example, such a sound statistic database can be used for searching for a predetermined space having a designated environmental sound, atmosphere, or the like, for referring to an environmental sound or an atmosphere in a designated space, and for estimating change in an environment in a designated space from change in environmental sounds. Specifically, such a sound statistic database is suitable for searching for or referring to a piece of real estate, a shop, or the like whose environmental sounds and atmosphere are important factors for selection.

Therefore, by using the information processing device according to each of the embodiments of the present disclosure, it is possible to establish a sound statistic database with high usability and high possibility of application.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
An information processing device including:
a feature amount extraction unit configured to extract a feature amount from sounds in a predetermined space;
an identification unit configured to identify a type of a sound included in the sounds from the feature amount;
an information combining unit configured to generate sound statistic information in which the feature amount, the type of the sound, and spatiotemporal information of the predetermined space at a time of acquisition of the sound are associated with each other; and a database establishing unit configured to establish a sound statistic database by using the sound statistic information.

(2)

The information processing device according to (1), in which the spatiotemporal information includes at least one or more of information on a position of the predetermined space, information on date and time of acquisition of the sound, and information on a cardinal direction of a sound source of the sound.

(3)

The information processing device according to (1) or (2), in which the sound is a sound obtained by eliminating a noise section including a noise.

(4)

The information processing device according to (3), in which the noise is a wind sound.

(5)

The information processing device according to (3), in which the noise is a vibration sound of a recording device that has acquired the sound.

(6)

The information processing device according to any one of (1) to (5), in which the sound is acquired by a microphone array device including a plurality of microphones.

(7)

The information processing device according to any one of (1) to (6), in which the feature amount is a physical amount related to at least one or more of a sound volume, a wave form, and a frequency spectrum of the sound.

(8)

The information processing device according to any one of (1) to (7), further including a display generation unit configured to acquire the sound statistic information from the sound statistic database and generate display to be presented to a user in response to an inquiry request from the user.

(9)

The information processing device according to (8), in which the display generation unit generates display showing spatial distribution of the feature amount.

(10)

The information processing device according to (8), in which the display generation unit generates display showing temporal distribution of the feature amount.

(11)

The information processing device according to any one of (8) to (10), in which the display generation unit generates the display for each type of the sound.

(12)

The information processing device according to any one of (1) to (11), in which the predetermined space is a piece of real estate or a store.

(13)

An information processing method including:

extracting a feature amount from sounds in a predetermined space;

identifying a type of a sound included in the sounds from the feature amount;

generating, by a central processing unit, sound statistic information in which the feature amount, the type of the sound, and spatiotemporal information of the predetermined space at a time of acquisition of the sound are associated with each other; and establishing a sound statistic database by using the sound statistic information.

(14)

A program causing a computer to function as:

a feature amount extraction unit configured to extract a feature amount from sounds in a predetermined space;

an identification unit configured to identify a type of a sound included in the sounds from the feature amount;

an information combining unit configured to generate sound statistic information in which the feature amount, the type of the sound, and spatiotemporal information of the predetermined space at a time of acquisition of the sound are associated with each other; and a database establishing unit configured to establish a sound statistic database by using the sound statistic information.

REFERENCE SIGNS LIST 1, 2, 3 information processing system
4 network
5 sound
100 terminal device
110 sound acquisition unit
120 information acquisition unit
130 upload unit
140 preprocessing unit
200 information processing device
210 communication unit
220 feature amount extraction unit
230 identification unit
240 information combining unit
250 database establishing unit
260 sound statistic database
300 reference device
310 query generation unit
320 information reference unit
330 display generation unit

The invention claimed is:

1. An information processing device, comprising:
at least one processor configured to:
extract a feature amount from sound signal data, wherein the sound signal data corresponds to a plurality of sounds in a specific space;
identify a type of a sound of the plurality of sounds based on the feature amount;
generate sound statistic information in which the feature amount is associated with the type of the sound and spatiotemporal information, wherein the spatiotemporal information is information of the specific space at a time of acquisition of the sound;
create a sound statistic database based on the sound statistic information;
receive an inquiry request that includes at least one of the type of the sound, spatial information, or temporal information;
acquire the sound statistic information from the sound statistic database based on the inquiry request and the association, wherein the acquired sound statistic information corresponds to the at least one of the type of the sound, the spatial information, or the temporal information; and control a display device to display the acquired sound statistic information.

2. The information processing device according to claim 1, wherein the spatiotemporal information includes the information on at least one a position of the specific space, a date and the time of the acquisition of the plurality of sounds, or a cardinal direction of a sound source of the plurality of sounds.

3. The information processing device according to claim 1, wherein the plurality of sounds is obtained based on elimination of a noise section in the plurality of sounds, wherein the noise section includes a noise.

4. The information processing device according to claim 3, wherein the noise is a wind sound.

5. The information processing device according to claim 3, wherein the noise is a vibration sound of a recording device that has acquired the plurality of sounds.

6. The information processing device according to claim 1, wherein the plurality of sounds is acquired by a microphone array device including a plurality of microphones.

7. The information processing device according to claim 1, wherein the feature amount is a physical amount that is at least one of a sound volume of the plurality of sounds, a wave form of the plurality of sounds, or a frequency spectrum of the plurality of sounds.

8. The information processing device according to claim 1, wherein the at least one processor is further configured to control the display device to display a spatial distribution of the feature amount.

9. The information processing device according to claim 1, wherein the at least one processor is further configured to control the display device to display a temporal distribution of the feature amount.

10. The information processing device according to claim 1, wherein the at least one processor is further configured to:
identify the type of each of the plurality of sounds; and
control the display device to display the type of each of the plurality of sounds.

11. The information processing device according to claim 1, wherein the specific space is one of a piece of real estate or a store.

12. The information processing device according to claim 1, wherein the at least one processor is further configured to control the display device to display, in a single graph, sound pressure of each type of the plurality of sounds.

13. The information processing device according to claim 1, wherein the at least one processor is further configured to display at least one of a line chart, a histogram, or a map based on the inquiry request that includes the spatial information, wherein the at least one of the line chart, the histogram, or the map corresponds to the sound statistic information of the spatial information in the inquiry request, and wherein the spatial information is information of a position of the specific space.

14. An information processing method, comprising:
extracting a feature amount from sound signal data, wherein the sound signal data corresponds to a plurality of sounds in a specific space;
identifying a type of a sound of the plurality of sounds based on the feature amount;
generating, by a central processing unit, sound statistic information in which the feature amount is associated with the type of the sound and spatiotemporal information, wherein the spatiotemporal information is information of the specific space at a time of acquisition of the sound;
creating a sound statistic database based on the sound statistic information;
receiving an inquiry request that includes at least one of the type of the sound, spatial information, or temporal information;
acquiring the sound statistic information from the sound statistic database based on the inquiry request and the association, wherein the acquired sound statistic information corresponds to the at least one of the type of the sound, the spatial information, or the temporal information; and
controlling a display device to display the acquired sound statistic information.

15. A non-transitory computer-readable medium having stored thereon, computer-executable instructions which, when executed by a computer, cause the computer to execute operations, the operations comprising:
extracting a feature amount from sound signal data, wherein the sound signal data corresponds to a plurality of sounds in a specific space;
identifying a type of a sound of the plurality of sounds based on the feature amount;
generate generating sound statistic information in which at least the feature amount is associated with the type of the sound, and spatiotemporal information, wherein the spatiotemporal information is information of the specific space at a time of acquisition of the sound;
creating a sound statistic database based on the sound statistic information;
receiving an inquiry request that includes at least one of the type of the sound, spatial information, or temporal information;
acquiring the sound statistic information from the sound statistic database based on the inquiry request, wherein the acquired sound statistic information corresponds to the at least one of the type of the sound, the spatial information, or the temporal information; and
controlling a display device to display the acquired sound statistic information.

\* \* \* \* \*